United States Patent [19]

Sugino et al.

[11] Patent Number: 5,555,951
[45] Date of Patent: Sep. 17, 1996

[54] ELECTRICALLY OPERATED POWER STEERING APPARATUS WITH IMPROVED HOUSING ASSEMBLY

[75] Inventors: Mitsutaka Sugino; Yasuo Shimizu, both of Saitama, Japan

[73] Assignee: Honda Giken Kogyo Kabushiki Kaisha, Tokyo, Japan

[21] Appl. No.: 309,892

[22] Filed: Sep. 20, 1994

[30] Foreign Application Priority Data

Sep. 24, 1993 [JP] Japan .................. 5-051780 U
Sep. 24, 1993 [JP] Japan .................. 5-051781 U

[51] Int. Cl.⁶ ..................................... B62D 5/04
[52] U.S. Cl. .......................................... 180/444
[58] Field of Search .................. 180/79.1, DIG. 3, 180/142, 148; 364/424.05

[56] References Cited

U.S. PATENT DOCUMENTS

| | | | |
|---|---|---|---|
| Re. 32,222 | 8/1986 | Drutchas | 180/79.1 |
| 4,666,014 | 5/1987 | Carlson et al. | 180/148 |
| 4,834,202 | 5/1989 | Shimizu | 180/79.1 |
| 5,083,626 | 1/1992 | Abe et al. | 180/79.1 |
| 5,257,828 | 11/1993 | Miller et al. | 180/79.1 |
| 5,299,649 | 4/1994 | Sano et al. | 180/79.1 |
| 5,437,349 | 8/1995 | Kurahashi et al. | 180/79.1 |

*Primary Examiner*—Brian L. Johnson
*Assistant Examiner*—F. Zeender
*Attorney, Agent, or Firm*—Armstrong, Westerman, Hattori, McLeland & Naughton

[57] ABSTRACT

An electrically operated power steering apparatus having an electric motor for producing forces to assist in axially moving a rack shaft having rack teeth held in mesh with a pinion mounted on an end of a steering shaft with a steering wheel mounted thereon. The electric motor and the rack shaft are accommodated in a housing assembly which comprise a first housing and a second housing which are separate from and fastened to each other in an axial direction of the rack shaft. The second housing comprises a smaller-diameter portion, a medium-diameter portion, and a larger-diameter portion which are axially successively joined by tapered portions. The electric motor has a stator fixed to an inner surface of the larger-diameter portion and a rotor rotatably disposed around the rack shaft in the larger-diameter portion.

6 Claims, 5 Drawing Sheets

F I G. 3
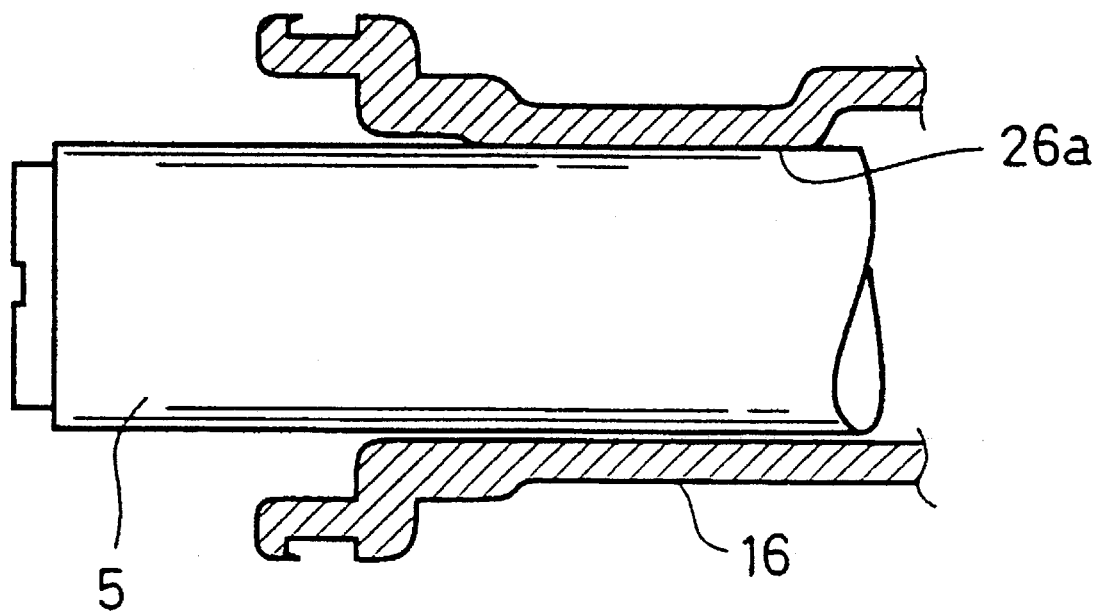

_5,555,951_

ELECTRICALLY OPERATED POWER STEERING APPARATUS WITH IMPROVED HOUSING ASSEMBLY

BACKGROUND OF THE INVENTION

1. Field of the Invention

The present invention relates to an electrically operated power steering apparatus for use on an automobile.

2. Description of the Related Art

An electrically operated power steering apparatus on automobiles include a rack shaft which is axially movable by a pinion coupled to a steering shaft with a steering wheel mounted on an upper end thereof. When the rack shaft is axially moved by the pinion upon rotation of the steering wheel, tie rods connected respectively to opposite ends of the rack shaft are moved to turn or steer respective road wheels. At this time, the steering torque of the steering shaft is detected, and an electric motor combined with the rack shaft is energized based on the detected steering torque. The force produced by the electric motor is transmitted through a ball-and-nut mechanism to the rack shaft to assist the rack shaft in its axial movement for steering the road wheels. One such electrically operated power steering apparatus is disclosed in Japanese laid-open patent publication No. 62-261573 which corresponds to U.S. Pat. No. 4,666,014.

The disclosed electrically operated power steering apparatus includes a pinion housing which accommodates a pinion rotatable with a steering shaft, a motor housing which accommodates an electric motor, and an outer housing which accommodates a ball-and-nut mechanism for transmitting the force generated by the electric motor to a rack shaft. The pinion housing, the motor housing, and the outer housing are fastened into a housing assembly.

Since the housing assembly is composed of three independent housings, the number of parts used and the number of fastened regions are relatively large, the strength with which the rack shaft is supported by the housing assembly is relatively low, and it is tedious and time-consuming to assemble the housing assembly. The housing assembly is assembled by superimposing opposite ends of the motor housing on respective ends of the pinion and outer housings, and fastening the superimposed ends with bolts. Therefore, the motor housing is larger in diameter than the pinion and outer housings, and the heads of the bolts project radially outwardly from the outer surface of the motor housing.

The electric motor is disposed around the rack shaft in the motor housing coaxially with the rack. The electric motor is supplied with an electric current through wires that extend from an external power supply into the motor housing in which the wires are connected to the electric motor.

Inasmuch as the electrically operated power steering apparatus has a high maximum current requirement and is installed in the engine compartment of an automobile, it is necessary that the wires have a large diameter with a highly heat-resistant, hard covering. It has been customary to use a rubber grommet as a seal between the motor housing and the wires.

The thick wires are introduced directly into the motor housing. Therefore, when the electrically operated power steering apparatus is assembled, it is cumbersome to position the wires neatly in place and fix the wires to the motor housing through the rubber grommet. The rubber grommet must be deep enough to provide a sufficient seal around the wires, but the deep rubber grommet requires that the motor housing be large in size.

SUMMARY OF THE INVENTION

It is an object of the present invention to provide an electrically operated power steering apparatus which includes a housing assembly including a reduced number of parts, a reduced number of fastened regions, and supporting a rack shaft with a high degree of strength.

Another object of the present invention is to provide an electrically operated power steering apparatus which includes a housing assembly that can be assembled with ease.

According to the present invention, there is provided an electrically operated power steering apparatus comprising a housing assembly, a steering shaft with a pinion mounted thereon, the steering shaft being rotatably supported by the housing assembly, a rack shaft axially movably disposed in the housing assembly and held in mesh with the pinion, an electric motor mounted coaxially on the rack shaft in the housing assembly and having a stator and a rotor, and a ball-and-nut mechanism mounted on the rack shaft for transmitting power from the electric motor to the rack shaft, the housing assembly comprising a first housing and a second housing which are separate from and fastened to each other in an axial direction of the rack shaft, the pinion being housed in the first housing, the first housing including a smaller-diameter portion supporting the rack shaft slidably therein and a larger-diameter portion having an end joined to the first housing, the stator being fixed to an inner surface of the larger-diameter portion, the rotor being rotatably disposed around the rack shaft in the larger-diameter portion.

The second housing may further include a medium-diameter portion disposed between the smaller-diameter portion and the larger-diameter portion, the smaller-diameter portion and the medium-diameter portion being Joined to each other by a first tapered portion, and the medium-diameter portion and the larger-diameter portion being joined to each other by a second tapered portion.

The smaller-diameter portion, the medium-diameter portion, the larger-diameter portion, and the tapered portions may be of a unitary structure.

Alternatively, the smaller-diameter portion and the first tapered portion may be of a unitary structure, and the medium-diameter portion, the second tapered portion, and the larger-diameter portion may be of a unitary structure, the medium-diameter portion and the first tapered portion being welded to each other.

The electrically operated power steering apparatus may further comprise a coupler electrically connected to the electric motor, the coupler being sandwiched between the first and second housings.

The first and second housings may have respective radially outwardly extending flanges fastened to each other by a bolt.

The above and further objects, details and advantages of the present invention will become apparent from the following detailed description of preferred embodiments thereof, when read in conjunction with the accompanying drawings.

BRIEF DESCRIPTION OF THE DRAWINGS

FIG. 3 is an enlarged fragmentary cross-sectional view showing a modified structure by which a rack shaft is supported in the second housing;

DETAILED DESCRIPTION OF THE PREFERRED EMBODIMENTS

Figure 1:
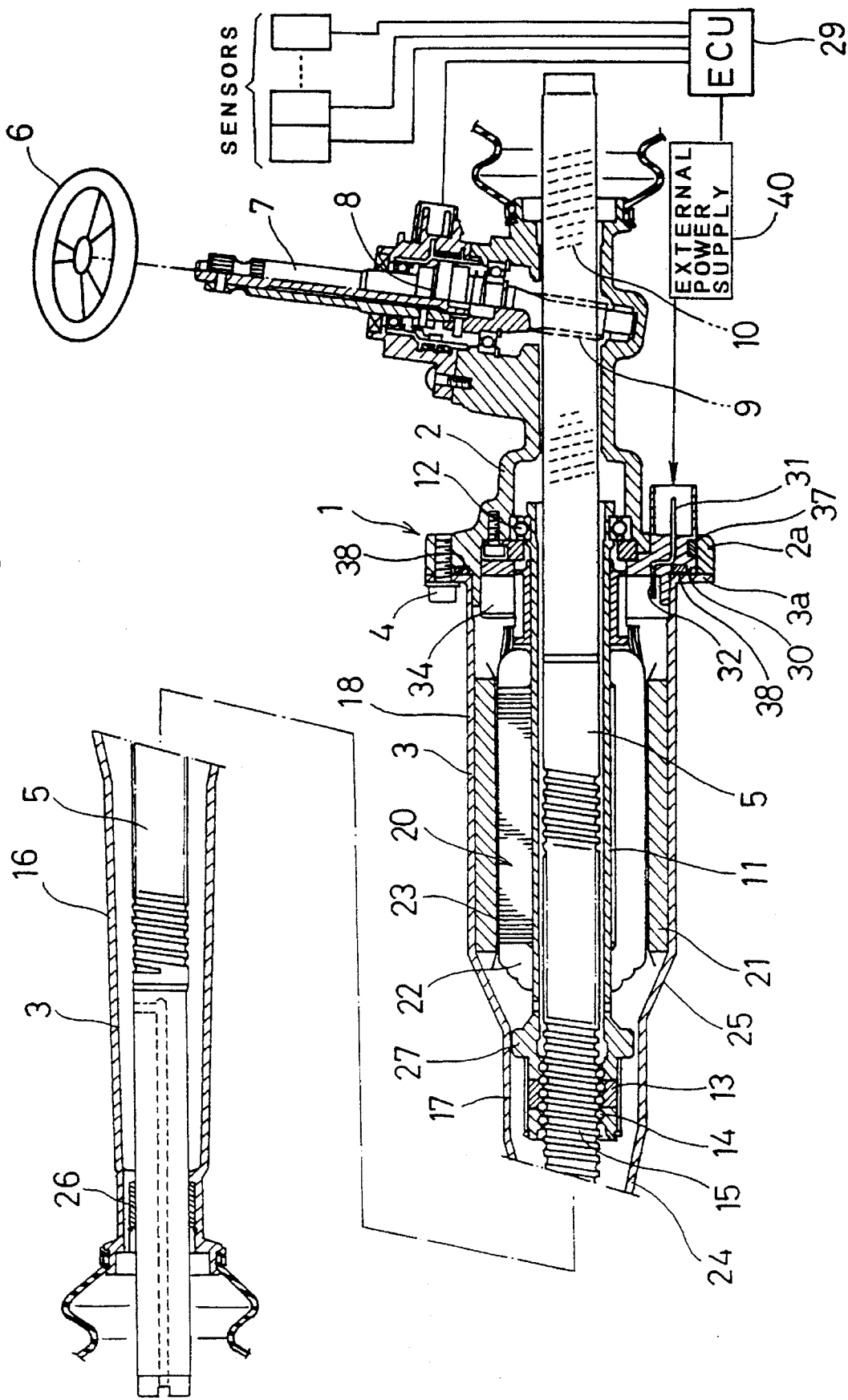
FIG. 1 is a fragmentary cross-sectional view of an electrically operated power steering apparatus according to an embodiment of the present invention.

As shown in FIG. 1, an electrically operated power steering apparatus according to a preferred exemplary embodiment of the present invention comprises a housing assembly 1 composed of a first housing 2 and a second housing 3 which having radially outwardly extending flanges 2a, 3a, respectively, that are fastened to each other by a bolt 4 extending axially through the flanges 2a, 3a. A rack shaft 5 extends longitudinally through the housing assembly 1 and has opposite ends projecting out of the housing assembly 1 through respective opposite ends thereof. The projecting ends of the rack shaft 5 are connected to tie rods (not shown) which are coupled to steerable road wheels (not shown) of an automobile. When the rack shaft 5 is moved axially, it causes the tie rods to turn or steer the steerable road wheels.

The first housing 2 is in the form of a metal casting. A steering shaft 7 which can be rotated about its own axis by a steering wheel 6 mounted on an upper end thereof has a lower end portion inserted in the first housing 2. A steering torque detecting mechanism 8 is mounted on the lower end portion of the steering shaft 7 and housed in the first housing 2. The lower end of the steering shaft 7 supports a pinion 9 fixed thereto which is held in mesh with rack teeth 10 of the rack shaft 5.

The second housing 3 is of an integral unitary structure shaped by rolling, and includes a smaller-diameter portion 16, a medium-diameter portion 17, and a larger-diameter portion 18 which are axially successively positioned. The smaller-diameter portion 16 and the medium-diameter portion 17 are axially joined to each other by a first tapered portion 24, and the medium-diameter portion 17 and the larger-diameter portion 18 are axially joined to each other by a second tapered portion 25. The smaller-diameter portion 16 is located remotely from the first housing 2 and progressively greater in diameter toward the first housing 2. The distal end of the smaller-diameter portion 16 supports therein a bushing 26 by which the rack shaft 5 is slidably guided.

The smaller- and medium-diameter portions 16, 17 and the larger-diameter portion 18 may be formed separately from each other, and then welded to each other into a unitary structure. In such case, the portions 16, 17, 18 are made substantially of the same material, such as metal of the same structure, constituents, etc., and have substantially the same thickness, to thereby minimize the increase of a radial dimension of the housing 3 at the joint.

An elongate tubular nut 11 is disposed around the rack shaft 5 which has an end rotatably supported in the first housing 2 by a bearing 12. The other end of the elongate tubular nut 11, which is positioned in the medium-diameter portion 17 of the second housing 3, supports a nut element 13 disposed around the rack shaft 5. A plurality of steel balls 14 are held between the nut element 13 and a helical groove 15 defined in an outer circumferential surface of the rack shaft 5. The nut element 13, the steel balls 14, and the helical groove 15 jointly constitute a ball-and-nut mechanism.

An electric motor 20 is disposed between the larger-diameter portion 18 of the second housing 3 and the elongate tubular nut 11. The electric motor 20 comprises a stator 21 in the form of a permanent magnet fixedly mounted on an inner circumferential surface of the larger-diameter portion 18, and a stator composed of an iron core 23 mounted on an outer circumferential surface of the elongate tubular nut 11 and windings 22 disposed on the iron core 23. The larger-diameter portion 18 serves as a yoke.

The elongate tubular nut 11 has a stopper 27 disposed in the medium-diameter portion 17 and held against an inner circumferential surface thereof for spacing the stator 21 and the rotor from each other by a certain distance to prevent the stator 21 and the rotor from contacting each other while the electric motor 20 is operating.

A coupler 30 is axially sandwiched between the flange 2a of the first housing 2 and the flange 3a of the second housing 3 through seals 37, 38.

Figure 4:
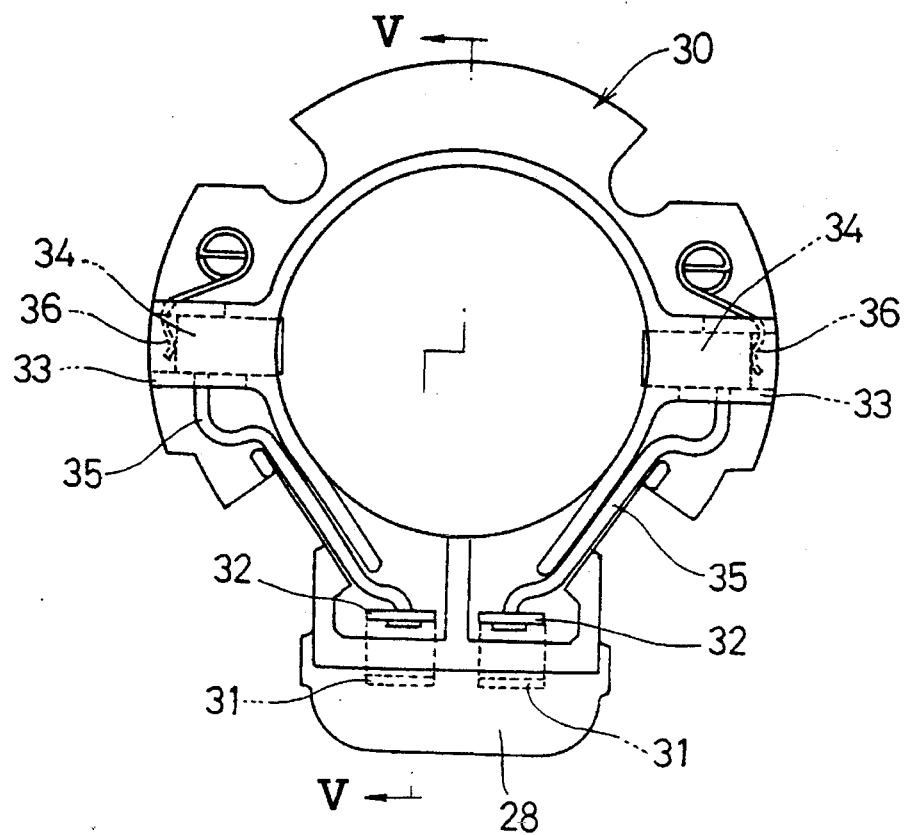
FIG. 4 is an enlarged plan view of a coupler of the electrically operated power steering apparatus.
Figure 5:
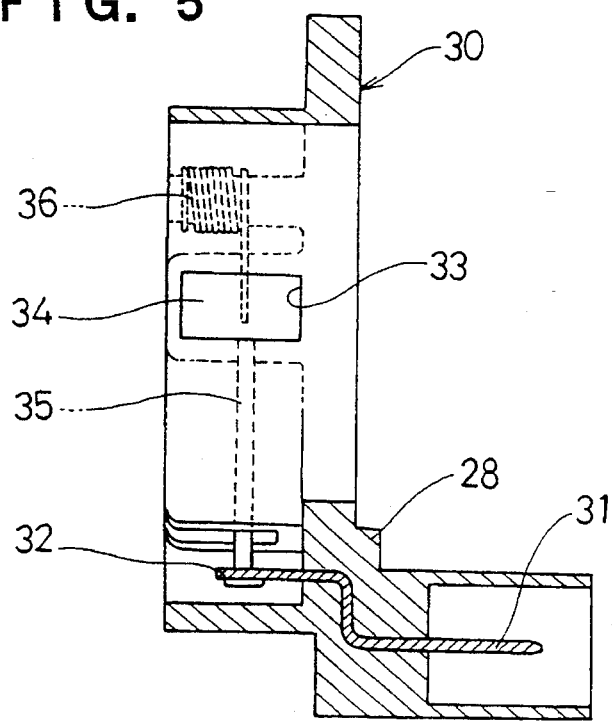
FIG. 5 is a cross-sectional view taken along line V—V of FIG. 4.

As also shown in FIGS. 4 and 5, the coupler 30 has a pair of outer connectors 31 for connection to an external power supply 40 (see FIG. 1), and a pair of inner connectors 32 for connection to the electric motor 20, the inner and outer connectors 31, 32 being electrically connected to each other and partly embedded in an electrically insulating member 28.

The coupler 30 has a pair of brush holders 33 which hold respective brushes 34 that are electrically connected to the respective inner connectors 32 by flexible leads 35. The brushes 34 are normally urged radially inwardly by springs 34 into resilient sliding contact with the rotor of the electric motor 20.

As shown in FIG. 1, signals from the steering torque detecting mechanism 8 and various sensors including an automobile speed sensor, a motor current sensor, and a steering angle sensor are supplied to an electronic control unit (ECU) 29. Based on the supplied signals, the ECU 29 Generates and applies a control signal to an external power supply 40, which then supplies an electric current to the electric motor 20 according to the control signal.

When the electric motor 20 is energized, the elongate tubular nut 11 is rotated around the rack shaft 5. The rotation of the elongate tubular nut 11 is transmitted as assistive axial movement of the rack shaft 5 by the ball-and-nut mechanism.

FIG. 3 shows a modified structure by which the rack shaft 5 is supported in the second housing 3. According to the modified structure shown in FIG. 3, the smaller-diameter portion 16 of the second housing 3 has three or four radially inwardly embossed regions or lands 26a (only one shown in FIG. 3), and the rack shaft 5 is guided by these radially inwardly embossed regions or lands 26a.

Figure 2:
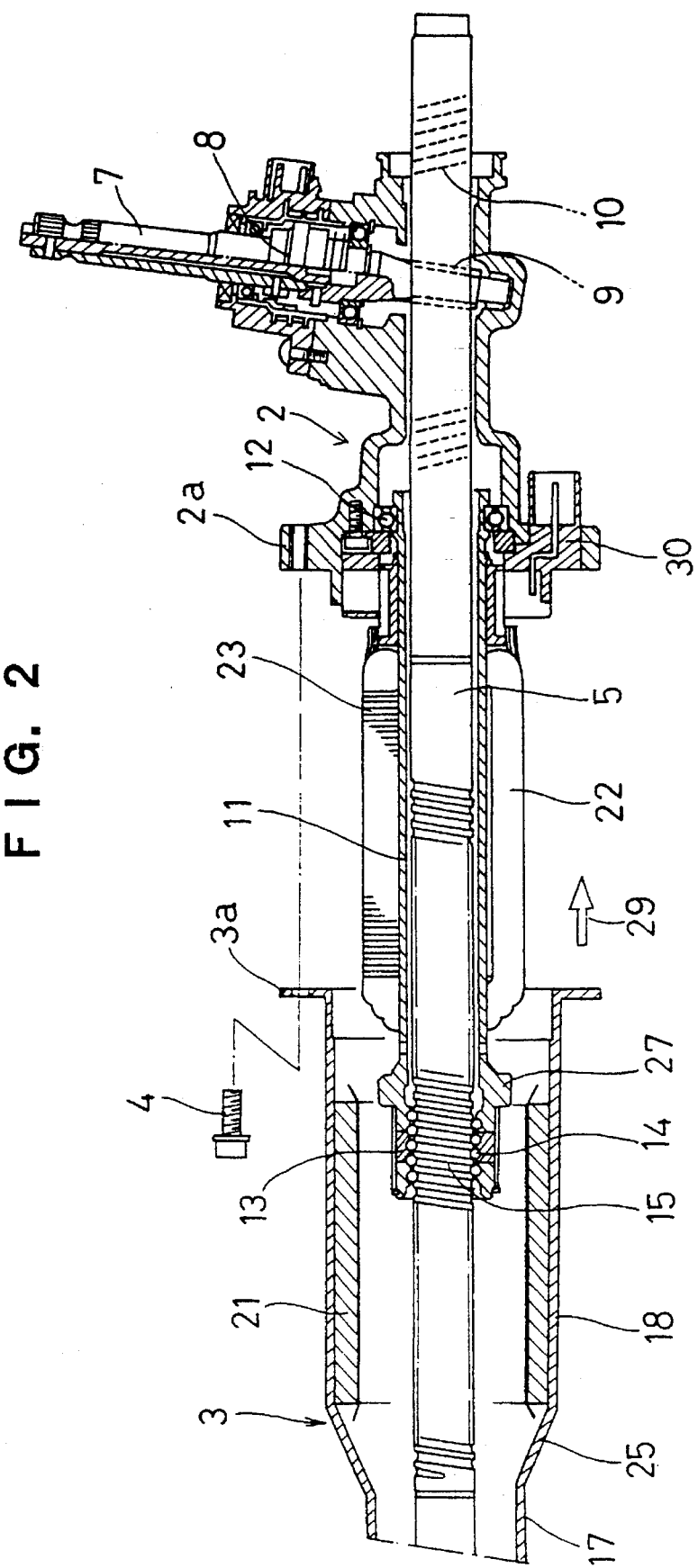
FIG. 2 is an exploded cross-sectional view showing first and second housings of the electrically operated power steering apparatus before they are fastened to each other.

The electrically operated power steering apparatus shown in FIG. 1 is assembled as follows:

As shown in FIG. 2, the rack shaft 5, the steering shaft 7, the steering torque detecting mechanism 8, and the pinion 9 are mounted in the first housing 2. Then, the elongate tubular nut 11 with the ball-and-nut mechanism is rotatably supported around the rack shaft 5 by the first housing 2 through the bearing 12. The iron core 23 and the windings 22 are installed on the elongate tubular nut 11.

The second housing 3 with the stator 21 mounted in the larger-diameter portion 18 thereof is then fitted over the iron core 23 and the windings 22 on the rack shaft 5 in the direction indicated by the arrow 29 in FIG. 2. Then, the flanges 2a, 3a of the first and second housings 2, 3 are fastened to each other by the bolt 4 with the coupler 30 clamped between the flanges 2a, 3a. The flanges 2a, 3a may be joined to each other by roll-staking rather than the bolt 4.

As described above, the housing assembly 1 is composed of the first and second housings 2, 3, and the larger-diameter portion 18 of the second housing 3 serves as the yoke of the electric motor 20. The number of parts and the number of fastened regions of the housing assembly 1 are smaller than those of the conventional housing assembly. The rack shaft 5 is therefore supported with increased strength by the housing assembly 1.

The housing assembly 1 can easily be assembled simply by mounting the rack shaft 5 with the ball-and-nut mechanism and the motor rotor in the first housing 2 and then inserting the rack shaft 5 into the second housing 3.

Furthermore, since the coupler 30 with the inner and outer connectors 31, 32 encased in the electrically insulating member 28, the electric motor 20 is free of the danger of circuit breaks or short circuits, can easily be wired for electric connection to the external power supply 40, and can also easily be sealed for increased durability.

The electric motor 20 can also be assembled with ease as the spring-loaded brushes 34 are incorporated in the coupler 30.

Figure 6:
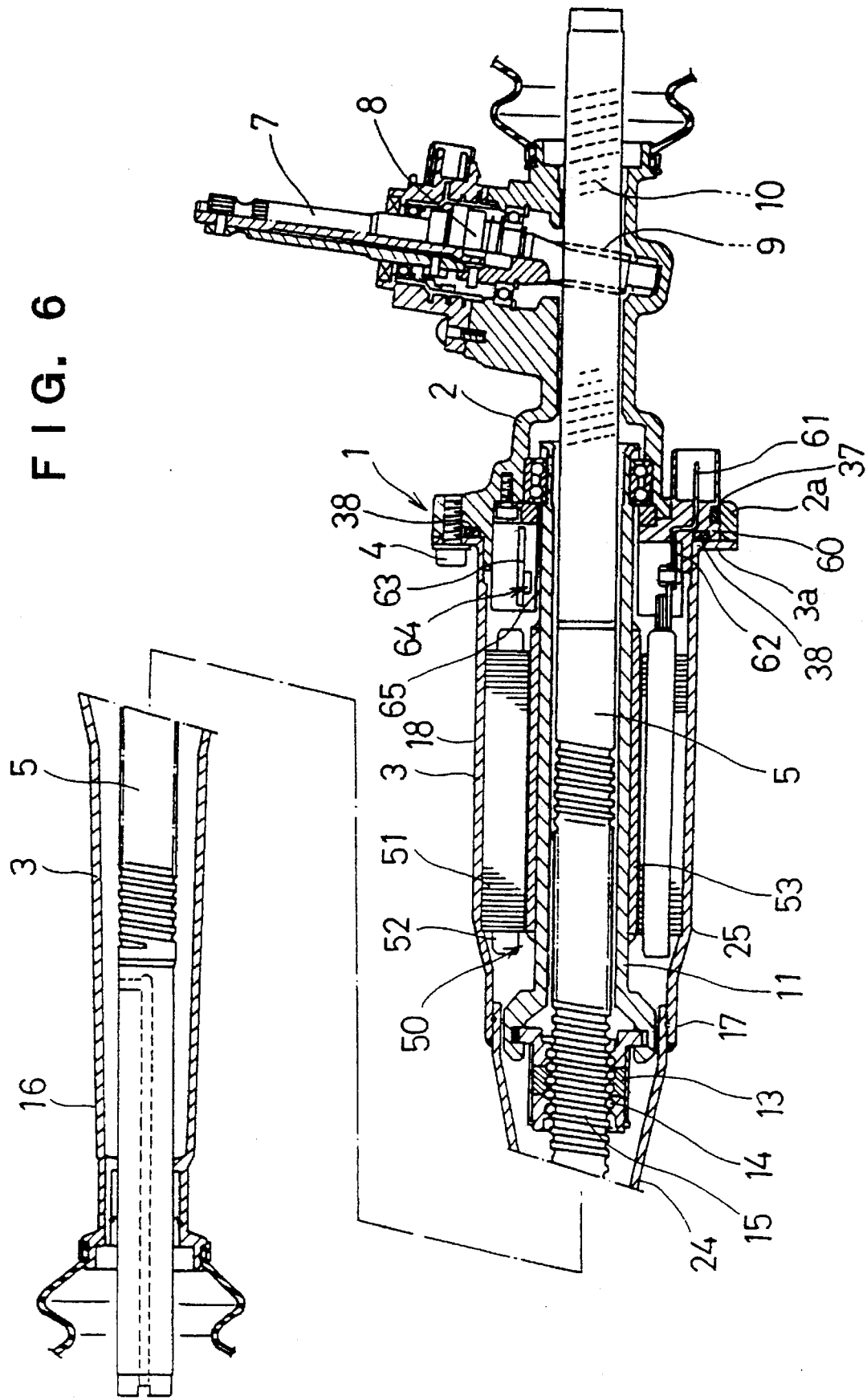
FIG. 6 is a fragmentary cross-sectional view of an electrically operated power steering apparatus according to another embodiment of the present invention.

FIG. 6 shows an electrically operated power steering apparatus according to another embodiment of the present invention.

Those parts of the electrically operated power steering apparatus shown in FIG. 6 which are similar or identical to those shown in FIG. 1 are denoted by identical reference numerals.

The electrically operated power steering apparatus includes a housing assembly 1 composed of first and second housings 2, 3, and the second housing 3 comprises a smaller-diameter portion 16, a medium-diameter portion 17, and a larger-diameter portion 18 which are successively joined by first and second tapered portions 24, 25. Specifically, the first tapered portion 24 and the smaller-diameter portion 16 are of a unitary structure, and the medium-diameter portion 17, the second tapered portion 25, and the larger-diameter portion 18 are of a unitary structure. The medium-diameter portion 17 is welded to the first tapered portion 24.

The electrically operated power steering apparatus has a brushless electric motor 50. The brushless electric motor 50 comprises a stator composed of an iron core 51 and windings 52 mounted thereon, the stator being mounted on an inner circumferential surface of the larger-diameter portion 18 of the second housing 3, and a rotor composed of a permanent magnet 53 mounted on an outer circumferential surface of the elongate tubular nut 11.

Since the brushless electric motor 50 has no brushes, it is necessary to detect the angular position of the permanent magnet 53 and supply the windings 52 with a positive or negative current depending on the detected angular position of the permanent magnet 53.

To meet the above requirement, a coupler 60 which is axially sandwiched between the flanges 2a, 3a has outer and inner connectors 61, 62 and also an angle detector for detecting the angular position of the motor rotor. Specifically, the angle detector comprises a Hall-effect element 64 mounted on an IC board 63 and a permanent magnet 65 attached to the outer circumferential surface of the elongate tubular nut 11 in radial alignment with the Hall-effect element 64.

The brushless electric motor 50 is highly durable as it suffers no brush wear.

The electric motor 50 can be assembled with ease as the angle detector is incorporated in the coupler 60.

Although there have been described what are at present considered to be the preferred embodiments of the invention, it will be understood that the invention may be embodied in other specific forms without departing from the essential characteristics thereof. The present embodiments are therefore to be considered in all respects as illustrative, and not restrictive. The scope of the invention is indicated by the appended claims rather than by the foregoing description.

What is claimed is:

1. An electrically operated power steering apparatus comprising:

a housing assembly;

a steering shaft with a pinion mounted thereon, said steering shaft being rotatably supported by said housing assembly;

a rack shaft axially movably disposed in said housing assembly and held in mesh with said pinion;

an electric motor mounted coaxially on said rack shaft in said housing assembly and having a stator and a rotor; and a ball-and-nut mechanism coaxially disposed about said rack shaft for transmitting power from said electric motor to said rack shaft;

said housing assembly comprising a first housing and a second housing which are separate from and fastened to each other in an axial direction of said rack shaft, said pinion being housed in said first housing, said second housing including a smaller-diameter portion slidably supporting said rack shaft therein and a larger-diameter portion having an end joined to said first housing, said smaller-diameter portion and said larger diameter portion being formed in a unitary structure, said second housing further including a medium-diameter portion disposed between said smaller-diameter portion and said larger-diameter portion., said smaller-diameter portion and said medium-diameter portion being joined to each other by a first tapered portion, said medium-diameter portion and said larger-diameter portion being joined to each other by a second tapered portion, and said ball-and-nut mechanism being housed in said medium-diameter portion of said second housing, said stator being fixed to an inner surface of said larger-diameter portion, said rotor being rotatably disposed around said rack shaft in said larger-diameter portion.

2. An electrically operated power steering apparatus according to claim 1, wherein said smaller-diameter portion and said larger-diameter portion have substantially the same thickness.

3. An electrically operated power steering apparatus according to claim 2, wherein said smaller-diameter portion and said larger-diameter portion are made substantially of the same material.

4. An electrically operated power steering apparatus according to claim 1, further comprising a coupler electrically connected to said electric motor, said coupler being sandwiched between said first and second housings.

5. An electrically operated power steering apparatus according to claim 1, wherein said first and second housings have respective radially outwardly extending flanges fastened to each other by a bolt.

6. An electrically operated power steering apparatus comprising:

a housing assembly;

a steering shaft with a pinion mounted thereon, said steering shaft being rotatably supported by said housing assembly;

a rack shaft axially movably disposed in said housing assembly and held in mesh with said pinion;

an electric motor mounted coaxially on said rack shaft in said housing assembly and having a stator and a rotor; and a ball-and-nut mechanism coaxially disposed about said rack shaft for transmitting power from said electric motor to said rack shaft;

said housing assembly comprising a first housing and a second housing which are separate from and fastened to each other in an axial direction of said rack shaft, said pinion being housed in said first housing, said second housing including a smaller-diameter portion slidably supporting said rack shaft therein and a larger-diameter portion, welded to said smaller-diameter portion, said larger-diameter portion having an end joined to said first housing, said smaller-diameter portion and said larger diameter portion being formed in a unitary structure, said second housing further including a medium-diameter portion disposed between said smaller-diameter portion and said larger-diameter portion, said smaller-diameter portion and said medium-diameter portion being joined to each other by a first tapered portion, said medium-diameter portion and said larger-diameter portion being joined to each other by a second tapered portion, and said ball-and-nut mechanism being housed in said medium-diameter portion of said second housing, said stator being fixed to an inner surface of said larger-diameter portion, said rotor being rotatably disposed around said rack shaft in said larger-diameter portion.

* * * * *